US012281516B2

(12) United States Patent
Agostino

(10) Patent No.: US 12,281,516 B2
(45) Date of Patent: Apr. 22, 2025

(54) DOOR STOPPER DEVICE

(71) Applicant: Giuseppe Agostino, King (CA)

(72) Inventor: Giuseppe Agostino, King (CA)

( * ) Notice: Subject to any disclaimer, the term of this patent is extended or adjusted under 35 U.S.C. 154(b) by 17 days.

(21) Appl. No.: 18/130,387

(22) Filed: Apr. 3, 2023

(65) Prior Publication Data

US 2023/0235607 A1 Jul. 27, 2023

Related U.S. Application Data

(63) Continuation-in-part of application No. 17/165,313, filed on Feb. 2, 2021, now abandoned.

(51) Int. Cl.
*E05F 5/06* (2006.01)
*E05C 17/04* (2006.01)

(52) U.S. Cl.
CPC .............. *E05F 5/06* (2013.01); *E05C 17/045* (2013.01)

(58) Field of Classification Search
CPC ............................. E05F 5/02; E05Y 2900/132
See application file for complete search history.

(56) References Cited

U.S. PATENT DOCUMENTS

| | | | | | |
|---|---|---|---|---|---|
| 2,055,743 A | * | 9/1936 | Falcone | E05D 11/06 | 16/86 A |
| 2,813,293 A | * | 11/1957 | Civitelli | E05F 5/06 | 16/86 B |
| 2,813,294 A | * | 11/1957 | Civitelli | E05D 11/06 | 292/74 |
| 2,889,571 A | * | 6/1959 | Moore | E05F 1/1215 | 292/228 |
| D194,452 S | * | 1/1963 | Holt | D8/402 | |
| 3,135,012 A | * | 6/1964 | Wessel | E05F 5/06 | 16/86 B |
| 3,157,906 A | * | 11/1964 | Wolf | E05D 11/00 | 16/50 |
| 3,187,372 A | * | 6/1965 | Parsons | E05F 5/06 | 16/86 A |
| 3,425,386 A | * | 2/1969 | Campbell | G08B 13/08 | 116/87 |
| 3,913,171 A | * | 10/1975 | Reid | E05F 5/06 | 16/342 |
| 3,971,100 A | * | 7/1976 | Anop | E05F 5/06 | 16/80 |
| 4,259,762 A | * | 4/1981 | Civitelli | E05D 11/06 | 16/86 B |
| 4,527,303 A | * | 7/1985 | Civitelli | E05D 11/06 | 16/236 |
| 4,858,273 A | * | 8/1989 | Civitelli | E05F 5/06 | 16/86 A |
| 4,998,941 A | * | 3/1991 | Smith | E05D 11/06 | 16/374 |
| 5,082,317 A | * | 1/1992 | Delaney, Jr. | E05C 17/56 | 292/DIG. 19 |

(Continued)

*Primary Examiner* — Jason W San
*Assistant Examiner* — Matthew J Sullivan

(57) ABSTRACT

A device for substantially preventing movement of a door; the device includes a first attachment plate, a second attachment plate, a stopper hinge and a at least one stopper assembly. In some embodiments, the at least one stopper assembly includes a first stopper assembly and a second stopper assembly. The device is useful for preventing movement of a door past a desired position, is easily installed and does not require removal of door hardware to install.

8 Claims, 12 Drawing Sheets

(56) References Cited

U.S. PATENT DOCUMENTS

| | | | | |
|---|---|---|---|---|
| 5,237,724 | A * | 8/1993 | Lee | E05F 5/06 16/86 B |
| 5,265,922 | A * | 11/1993 | Falcone | E05D 11/06 292/288 |
| D372,190 | S * | 7/1996 | Price | D8/402 |
| 5,711,557 | A * | 1/1998 | Nicolosi | E05C 17/54 292/288 |
| 5,727,289 | A * | 3/1998 | Reder | E05F 5/06 16/375 |
| 6,192,552 | B1 * | 2/2001 | Murphy | E05C 17/00 16/85 |
| 6,557,912 | B1 * | 5/2003 | Truong | E05C 17/50 292/342 |
| 6,651,295 | B2 * | 11/2003 | Hodson | E05F 5/08 16/86 A |
| 6,732,410 | B1 * | 5/2004 | Nedderman, Jr. | E05F 5/02 16/374 |
| 7,024,726 | B1 * | 4/2006 | Cornell | E05F 5/06 292/340 |
| D571,651 | S * | 6/2008 | Lee | D8/402 |
| D571,652 | S * | 6/2008 | Zhang | D8/402 |
| D608,632 | S * | 1/2010 | Lynch | D8/402 |
| D652,289 | S * | 1/2012 | Vu | D6/709 |
| D652,714 | S * | 1/2012 | Vu | D6/709 |
| D665,248 | S * | 8/2012 | Vu | D6/709 |
| 8,567,831 | B2 * | 10/2013 | Roti | E05C 17/56 16/82 |
| 9,267,317 | B2 * | 2/2016 | Vu | E05F 5/06 |
| D754,528 | S * | 4/2016 | Fujioka | D8/382 |
| 9,316,037 | B1 * | 4/2016 | Couvertier, II | E05F 5/02 |
| 9,915,088 | B2 * | 3/2018 | Catalano | E05F 5/06 |
| 10,352,082 | B1 * | 7/2019 | Shuba, Jr. | E05F 5/08 |
| 10,400,496 | B2 * | 9/2019 | Kuta | E05C 17/56 |
| 2003/0066163 | A1 * | 4/2003 | Hodson | E05C 17/52 16/85 |
| 2004/0045128 | A1 * | 3/2004 | Frushour | E05F 5/06 16/82 |
| 2006/0152019 | A1 * | 7/2006 | Depasquale | E05C 17/56 292/251.5 |
| 2008/0109988 | A1 * | 5/2008 | Jameson | E05F 5/02 16/82 |
| 2010/0132161 | A1 * | 6/2010 | Vu | E05F 5/08 16/404 |
| 2010/0269302 | A1 * | 10/2010 | Jagannathan | E05D 11/06 16/374 |
| 2014/0191515 | A1 * | 7/2014 | Gorlewski | E05C 19/163 292/138 |
| 2015/0361706 | A1 * | 12/2015 | Catalano | E05F 5/06 16/82 |

* cited by examiner

DOOR STOPPER DEVICE

This application claims the benefit of pending application Ser. No. 17/165,313, filed on Feb. 2, 2021, entitled Door Stopper Device.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of door stops of existing art and more specifically relates to door stops for preventing movement of a door past a desired position.

RELATED ART

A doorstop is a device used to hold a door open or closed, or to prevent a door from closing or from opening too widely. For example, individuals may use a doorstop to prop their door open in order to circulate air throughout their house, or businesses may use doorstops in order to keep their doors open during business hours.

Conventionally, doorstops have involved the use of heavy objects placed next to a door, or wedges slid under a door. However, these doorstops are unsatisfactory as they are unsightly, potential trip hazards and often become dislodged or moved. Some attempts have been made to overcome these problems by attaching the doorstop to the door itself or on an adjacent wall. However, these attempts are not ideal as they require removal of door hardware, cause damage to the door, and/or can only be used on particular doors. Thus, a suitable solution is desired.

SUMMARY OF THE INVENTION

In view of the foregoing disadvantages inherent in the known doorstop art, the present disclosure provides a novel door stopper device. The general purpose of the present disclosure, which will be described subsequently in greater detail, is to provide an easily installed door stopper device that holds a door in a desired position and does not require removal of, or attachment to, door hardware to install.

A device for substantially preventing movement of a door is disclosed herein. The door is movable between an open position and a closed position via at least one door hinge and the open position includes a varying degree of open positions. The device may include a first attachment plate configured to attach to the door and a second attachment plate configured to attach to a door frame. The door frame is adjacent the door in use.

A stopper hinge may be attached to the second attachment plate. At least one stopper assembly may be configured to selectively pivot about a vertical axis via the stopper hinge. The at least one stopper assembly may include a body and a stopper rod. The body may have a left arm, a right arm and tubular head attached about a mid-section thereof. The left arm may include a fastener means configured to removably attach the left arm to the first attachment plate and the right arm may be fixedly attached to the stopper hinge. Further, the stopper rod may be inserted into the tubular head. The at least one stopper assembly may be configured to prevent movement of the door past a desired position.

According to another embodiment, a method of using a device is also disclosed herein. The method includes providing the device as above; attaching the first attachment plate to the door; attaching the second attachment plate to the door frame; and preventing movement of the door past a desired position via the at least one stopper assembly.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a door stopper device, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a doorstop and more particularly to a door stopper device as used to hold a door in a desired position, such as in an open position or a closed position. The door stopper device is preferably easily installed for use with virtually any swinging door (about a vertical axis) and does not require the removal of door hardware to install.

Generally disclosed is a door stopper that may be independent from a door, in that the door stopper may function independently without utilizing existing hardware on the door. This may allow use of the door stopper with most doors. The door stopper may prevent the door from moving past a desired position. For example, the door stopper may prevent the door from opening too wide. The door stopper may also be adjustable. In some embodiments, the door stopper may also include a child safety lock. In this embodiment, the door stopper and child safety lock may be configured to lock the door in a closed position.

Referring now more specifically to the drawings by numerals of reference, there is shown in FIGS. 1-5, various views of a device 100.

Figure 1:
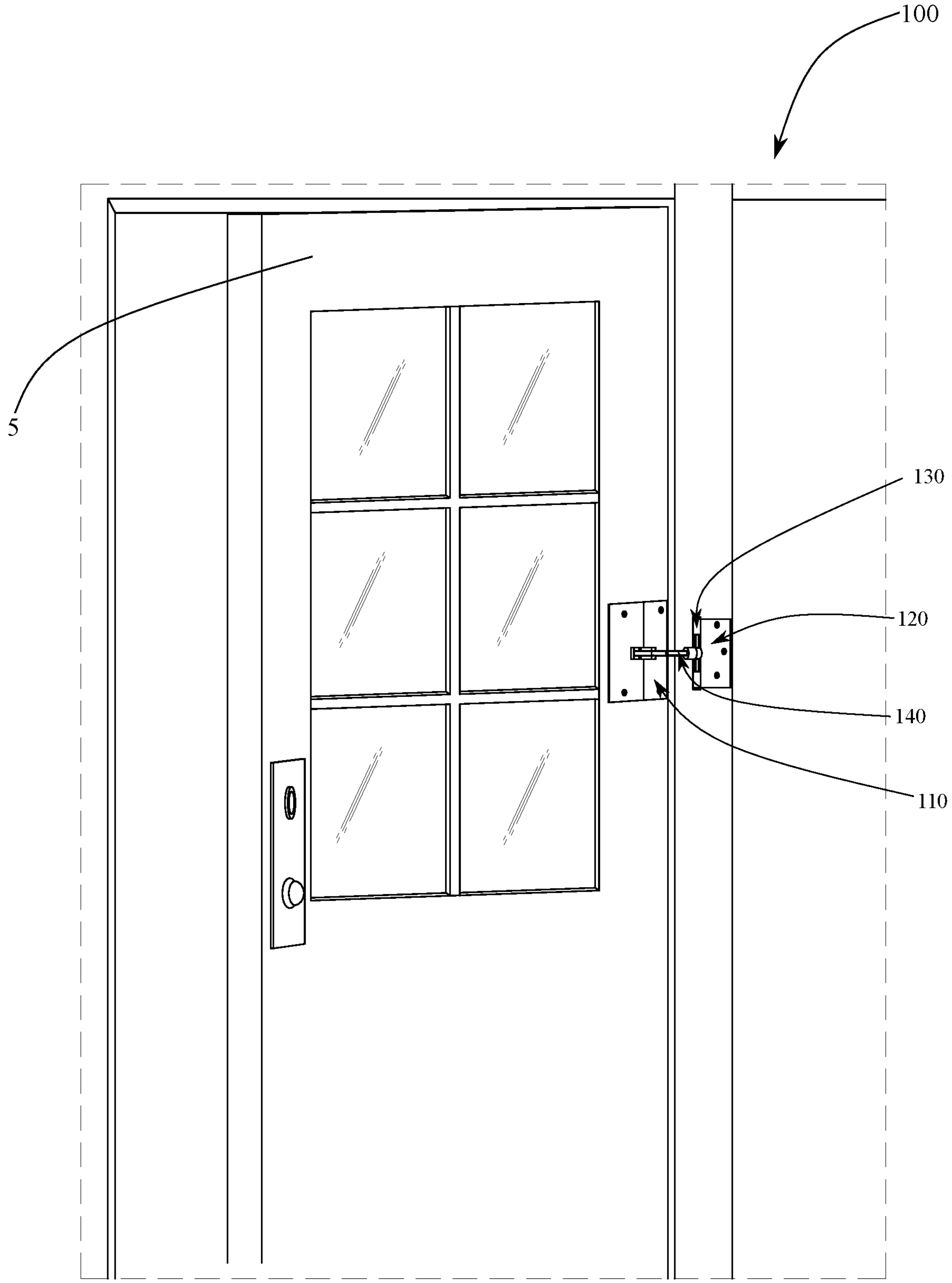
FIG. 1 is a front view of a device during an 'in-use' condition, according to an embodiment of the disclosure.

FIG. 1 shows a device 100 during an 'in-use' condition, according to an embodiment of the present disclosure. As illustrated, the device 100 may include a first attachment plate 110, a second attachment plate 120, a stopper hinge 130, and at least one stopper assembly 140. The device 100 may be used for substantially preventing movement of a door 5, the door 5 being movable between an open position and a closed position via at least one door hinge, the open position including a varying degree of said open positions.

Figure 2:
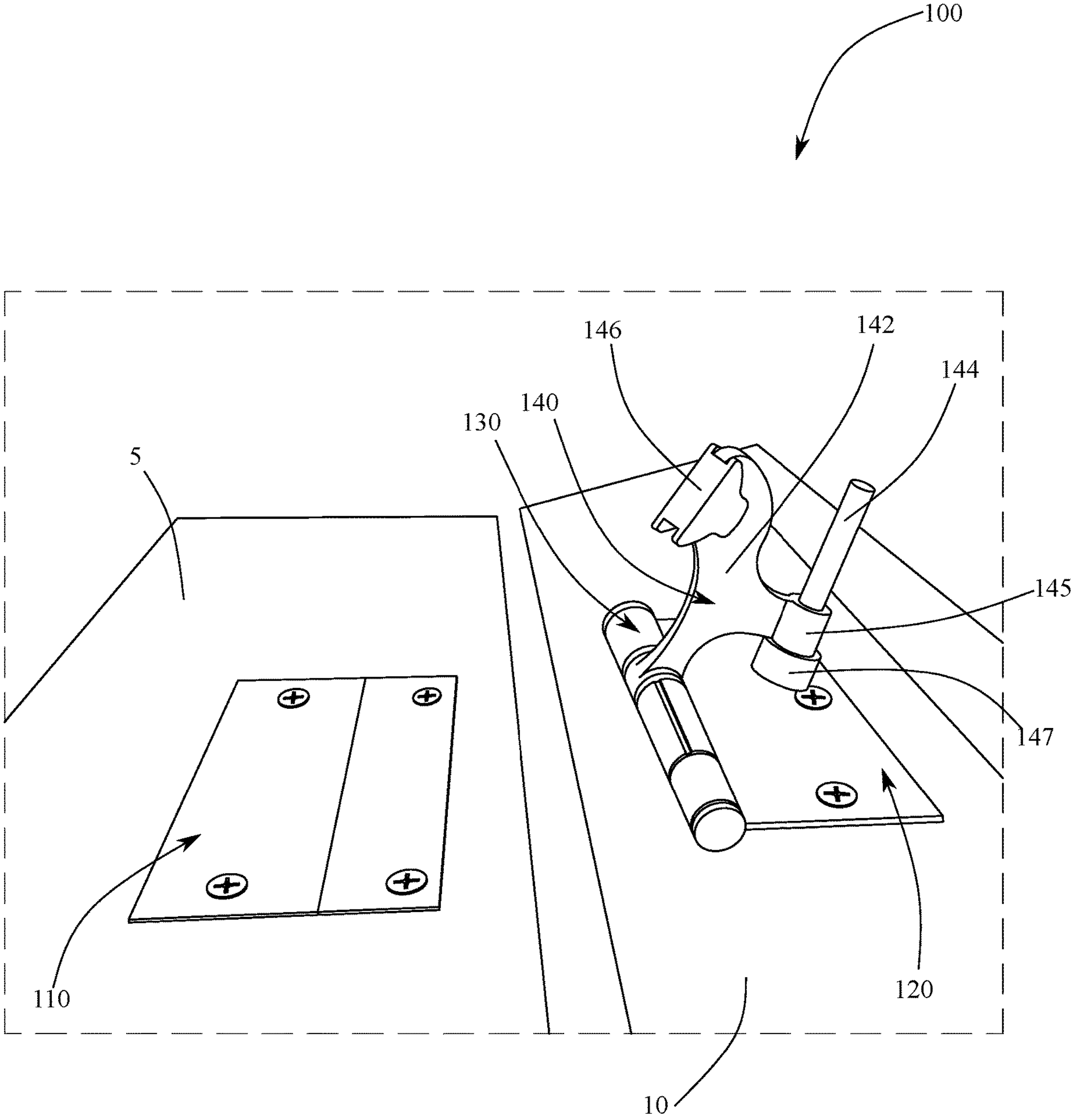
FIG. 2 is a bottom-front view of the device of FIG. 1 showing a first stopper assembly according to an embodiment of the present disclosure.
Figure 3:
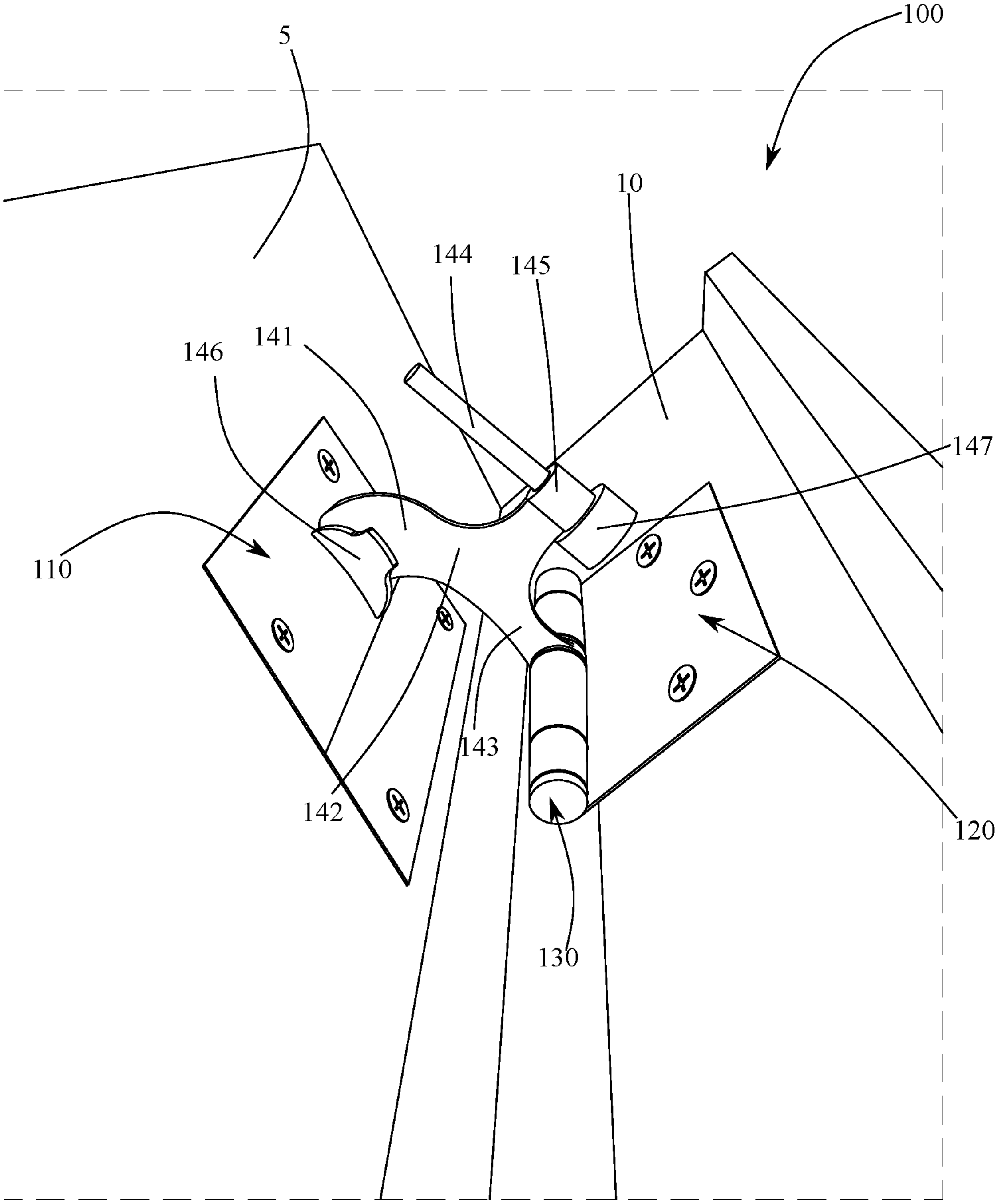
FIG. 3 is a bottom-front of the device of FIG. 1 showing the first stopper assembly according to an embodiment of the present disclosure.

Referring now to FIGS. 2-3 showing various views of the device 100 of FIG. 1, according to an embodiment of the present disclosure. The first attachment plate 110 may be configured to attach to the door 5. Preferably, the first attachment plate 110 may be configured to attach to the door 5 cleanly—in that no damage is made to the door 5. For example, the first attachment plate 110 may be attached to the door 5 via adhesive means such as self-adhesive screws. However, other attachment means may also be contemplated. Whilst it is preferable that the first attachment plate 110 is attached to the door 5 without causing damage to the door 5, in some embodiments, the first attachment plate 110 may be attached to the door 5 via permanent means.

The second attachment plate 120 may be configured to attach to a door frame 10 adjacent the door 5 in use. The second attachment plate 120 may also be attached or installed onto the door frame 10 without causing damage. However, in some embodiments, to provide stability, the second attachment plate 120 may be attached to the door frame 10 via screws. The screws may be 2 inches in length for example. The screws may fasten to behind a door frame casing and drywall adjacent the door 5. This may provide additional support to the device 100 when in use. To further aid in stability, the first attachment plate 110 and the second attachment plate 120 may comprise a steel material. However, other materials are also contemplated.

As shown, the stopper hinge 130 may be attached to the second attachment plate 120. Preferably, the stopper hinge 130 may be integral to the second attachment plate 120. The stopper hinge 130 may be a barrel hinge including a pin for allowing rotation of the same. In some embodiments, the stopper hinge 130 may also be made from the steel material, but again, other materials are also contemplated. The at least one stopper assembly 140 may be configured to selectively pivot about a vertical axis 131 via the stopper hinge 130. The addition of the stopper hinge 130 may prevent a need to utilize existing door hinges of the door 5 and may enable use of the device 100 on doors with sealed hinges.

The at least one stopper assembly 140 may be configured to prevent movement of the door 5 past a desired position. For example, the at least one stopper assembly 140 may hold the door 5 in the open position at a 90-degree angle. The at least one stopper assembly 140 may include a body 142 and a stopper rod 144. As shown, the stopper rod 144 may include a cap 147. The cap 147 may protect the door frame 10 and the second attachment plate 120. The body 142 may include a left arm 141, a right arm 143 and a tubular head 145 attached about a mid-section thereof. The right arm 143 may be fixedly attached to the stopper hinge 130 and the left arm 141 may include a fastener means 146 configured to removably attach the left arm 141 to the first attachment plate 110. The fastener means 146 may be a self-adhesive bracket, screw, etc. The fastener means 146 may removably or permanently attach the left arm 141 to the first attachment plate 110.

The stopper rod 144 may be inserted into the tubular head 145. In some embodiments, the stopper rod 144 may include male threads and the tubular head may include female threads. The stopper rod 144 may be threaded into the tubular head 145. Preferably, a length of the stopper rod 144 may be adjustable. In the thread embodiment, the length of the stopper rod 144 may be adjustable via selective unscrewing and screwing of the stopper rod 144 through the tubular head 145. Adjusting the length of the stopper rod 144 may dictate a degree to which the door 5 is held open. For example, as above, the at least one stopper assembly 140 may hold the door in the open position at a 90-degree angle. If a user desires the door to be held open at a 45-degree angle, they may extend the length of the stopper rod (either by screwing the stopper rod tighter or another method).

Figure 4:
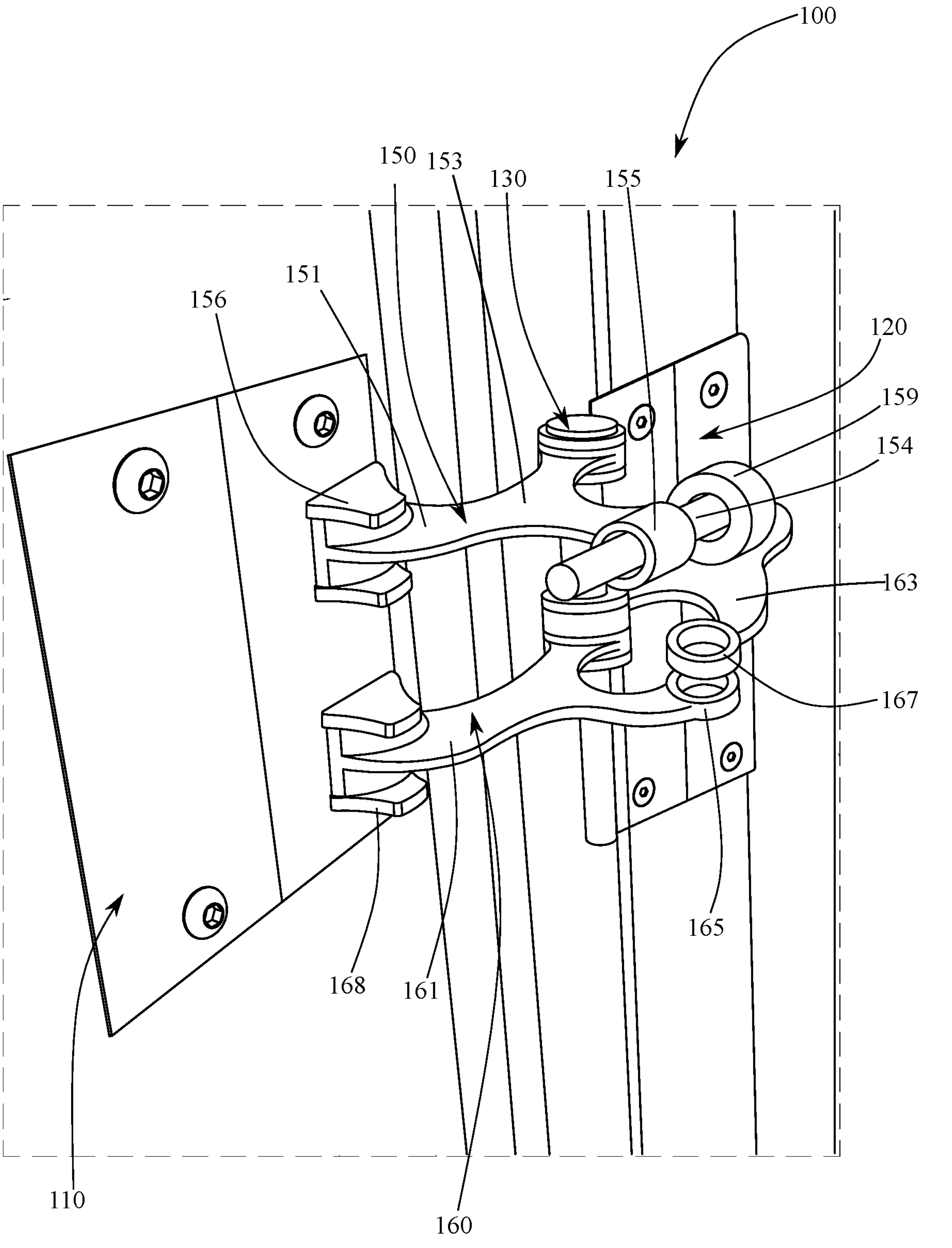
FIG. 4 is a left side-front view of the device of FIG. 1 showing the first stopper assembly and a second stopper assembly according to an embodiment of the present disclosure.
Figure 5:
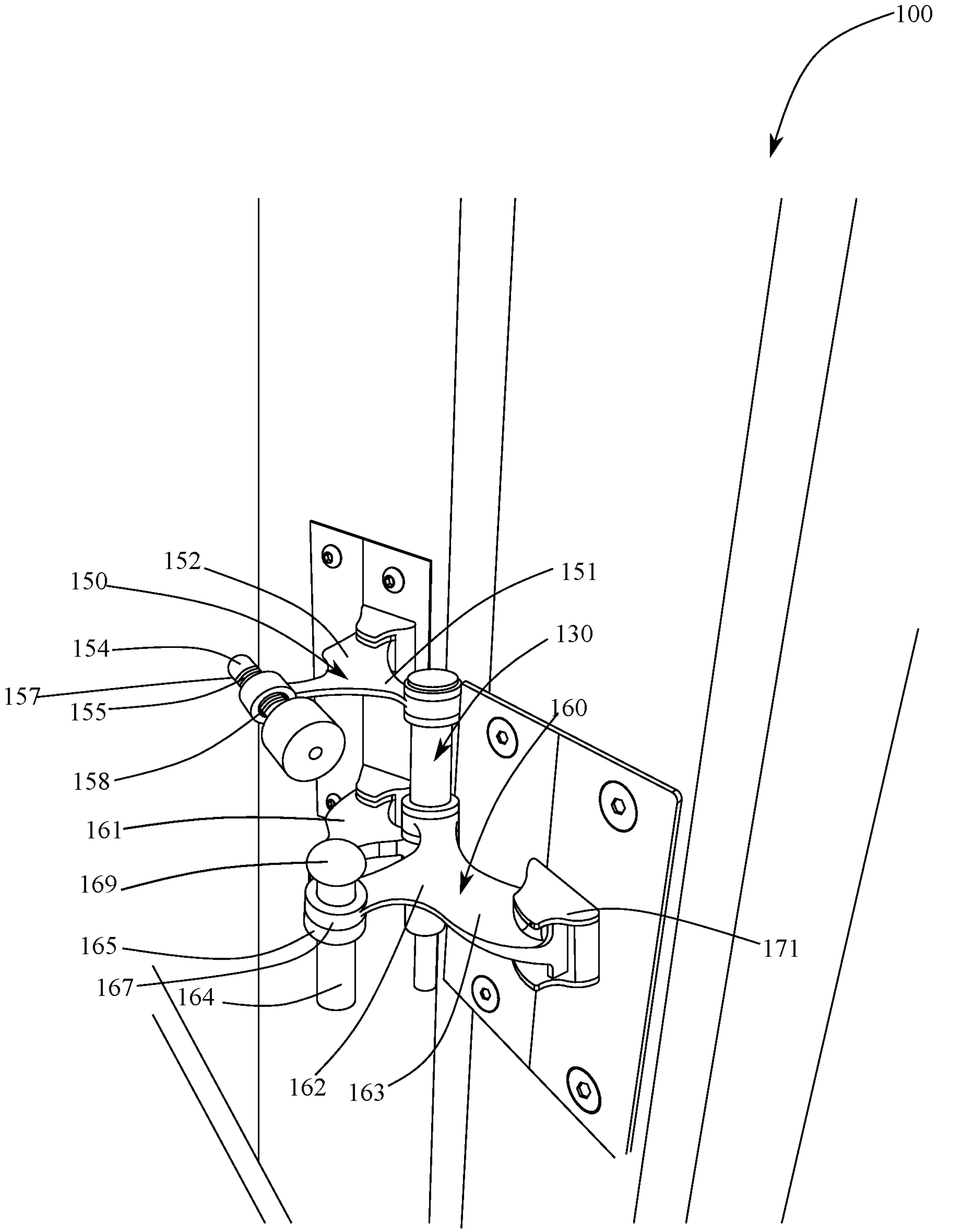
FIG. 5 is a right side-front view of the device of FIG. 1 showing the first stopper assembly and the second stopper assembly according to an embodiment of the present disclosure.

Referring now to FIGS. 4-5 showing various views of the device 100 of FIG. 1, according to an embodiment of the present disclosure. In some embodiments, the at least one stopper assembly 140 may include a first stopper assembly 150 and a second stopper assembly 160. The first stopper assembly 150 may include the same configuration and elements as discussed above with the at least one stopper assembly 140 and as is shown in FIGS. 2-3.

The first stopper assembly 150 may include a first body 152 and a first stopper rod 154. The first stopper rod 154 may include a first cap 159 attached to an end thereof. The first body 152 may include a first left arm 151, a first right arm 153, and a first tubular head 155. The first stopper rod 154 may be insertable into the first tubular head 155 and may be adjustable, as discussed above, as a length of the first stopper rod 154 may be adjusted such that a desired degree of open position 15 of the door can be achieved. Again, similar to above, the first stopper rod 154 may include a first male thread 157 and the first tubular head 155 may include a first female thread 158 configured to mate with the first stopper rod 154. The first left arm 151 may include a first fastener means 156 configured to removably attach the first left arm 151 to the first attachment plate 110 and the first right arm 153 may be fixedly attached to the stopper hinge 130.

In this embodiment shown in FIGS. 4-5, whereby the at least one stopper assembly 140 includes the first stopper assembly 150 and the second stopper assembly 160, the second stopper assembly 160 may act as a child safety lock.

In this embodiment, the second stopper assembly 160 may be selectively activated and may lock the door 5 in the closed position 20. The second stopper assembly 160 may be permanent to the device 100 or may be removable. The second stopper assembly 160 may include a second body 162 and a second stopper rod 164. Similar to above, the second stopper rod 164 may include a second cap 169 attached to an end thereof. The second body 162 may include a second left arm 161, a second right arm 163, a second tubular head 165 and a third tubular head 167. The second left arm 161 may include a second fastener means 168 configured to removably attach the second left arm 161 to the second attachment plate 120, and the second right arm 163 may include a third fastener means 171 configured to removably attach the second right arm 163 to the second attachment plate 120.

The second stopper rod 164 may be insertable through the second tubular head 165 and the third tubular head 167. This embodiment of the second stopper rod 164 may be similar to the embodiment discussed and shown with the first stopper assembly 150 (and the at least one stopper assembly 140). For example, in some embodiments, female and male threads may also be utilized with the second stopper rod 164 and the second and third tubular head 167, and the second stopper rod 164 may be adjustable. In other embodiments, the second stopper rod 164 may include a push pin configured to selectively engage and disengage at least one of the second tubular head 165 and the third tubular head 167. FIG. 4 demonstrates the push pin (second stopper rod 164) being disengaged from the second tubular head 165 and the third tubular head 167 and FIG. 5 demonstrates the push pin (second stopper rod 164) being engaged, and thereby locking the door.

For example, apertures in the second tubular head 165 and the third tubular head 167 may interlock (as shown in FIG. 4), and the push pin may be engaged when it is inserted therethrough. When the second stopper rod 164 is inserted through the second tubular head 165 and the third tubular head 167 the door 5 may be locked in the closed position 20. In the push pin embodiment, when the push pin is not engaged, as in the push pin is not inserted through both the second tubular head 165 and the third tubular head 167, the door 5 may be opened. To aid in security of the device 100, the first stopper rod 154 and the second stopper rod 164 may both be made from steel material. However, other materials are contemplated.

Figure 6:
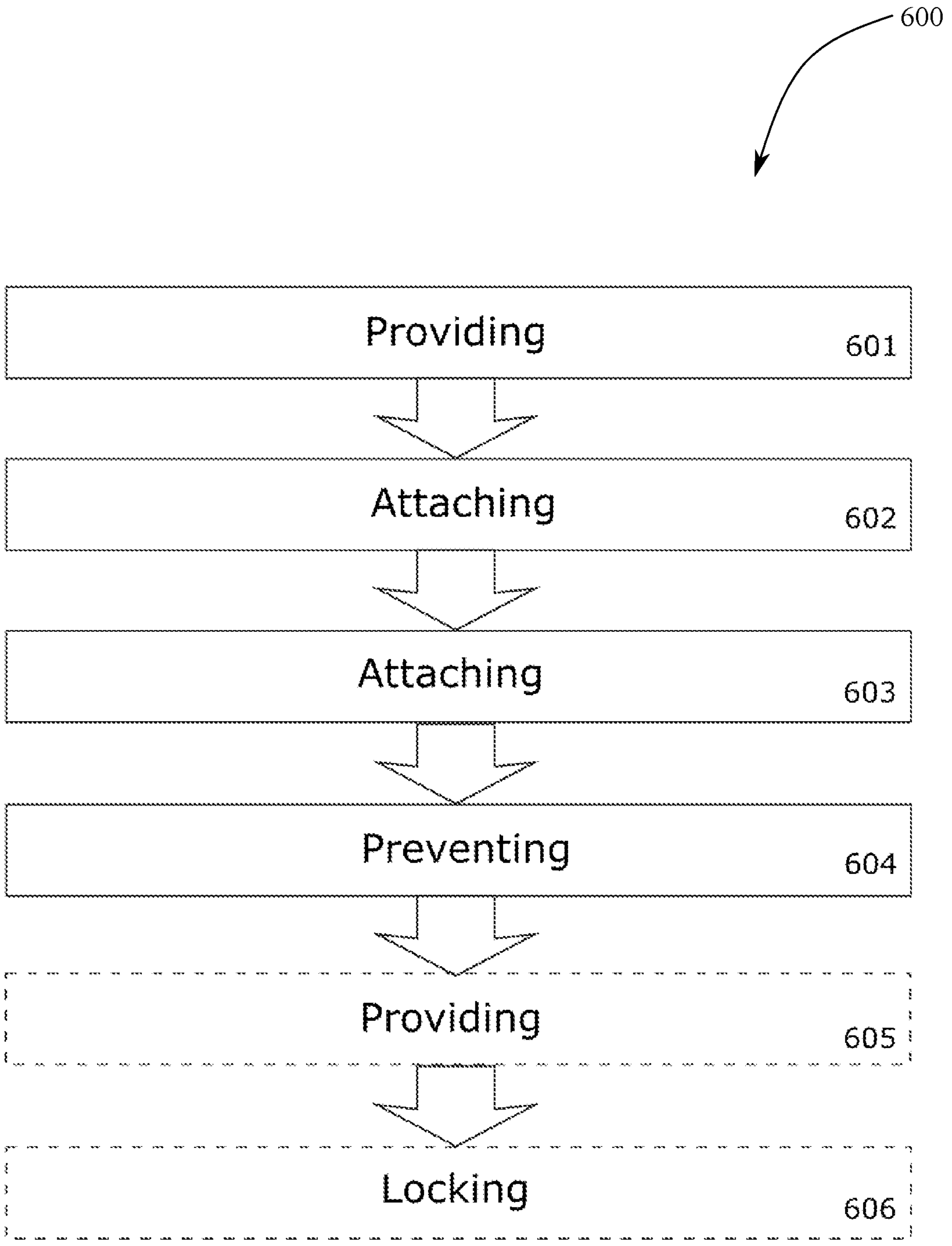
FIG. 6 is a flow diagram illustrating a method of using the device, according to an embodiment of the present disclosure.

Referring now to FIG. 6 showing a flow diagram illustrating method 600 of using a device, according to an embodiment of the present disclosure. In particular, the method 600 may include one or more components or features of the device 100 as described above. As illustrated, the method of use 600 may include the steps of: step one 601, providing the device as above; step two 602, attaching the first attachment plate to the door; step three 603, attaching the second attachment plate to the door frame; and step four 604, preventing movement of the door past a desired position via the at least one stopper assembly. Further steps may include: step five 605 providing the device whereby it includes the first stopper assembly and the second stopper assembly; and step six 606, locking the door in the closed position via insertion of the second stopper rod through the second tubular head and the third tubular head.

It should be noted that step five 605 and step six 606 are optional steps and may not be implemented in all cases. Optional steps of the method 600 are illustrated using dotted lines in FIG. 6 so as to distinguish them from the other steps of the method 600. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using the device 100 are taught herein.

Referring now FIGS. 7-12, additional embodiments are illustrated.

Figure 7:
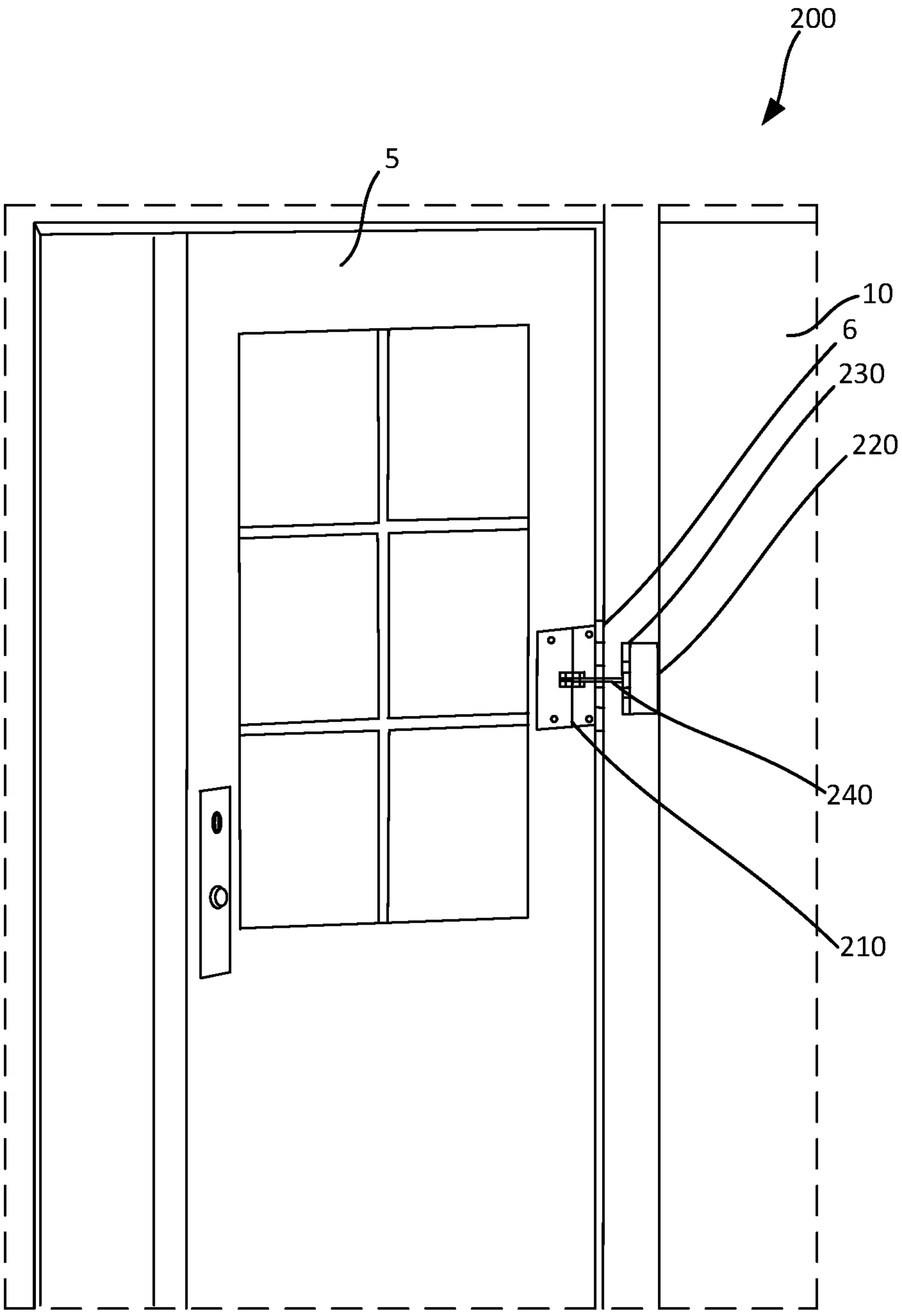
FIG. 7 is a front view of a device during an 'in-use' condition, according to an additional embodiment of the disclosure.

FIG. 7 shows a device 200 during an 'in-use' condition, according to an embodiment of the present disclosure. As illustrated, the device 200 may include a first attachment plate 210, a second attachment plate 220, a stopper hinge 230, and at least one stopper assembly 240. The device 200 may be used for substantially preventing movement of a door 5, the door 5 being movable between an open position and a closed position via at least one door hinge 6, the open position including a varying degree of said open positions.

The first attachment plate 210 is configured to attach to the door 5. The second attachment plate 220 is configured to attach to the door frame 10 adjacent the door 5 in use and in line with the first attachment plate 210. By having the placement of the first attachment plate 210 and the second attachment plate 220 on the door 5 and door frame 10, allows for the stoppage of door 5 without any interference or modification of the door hinge 6 by device 200.

Figure 8:
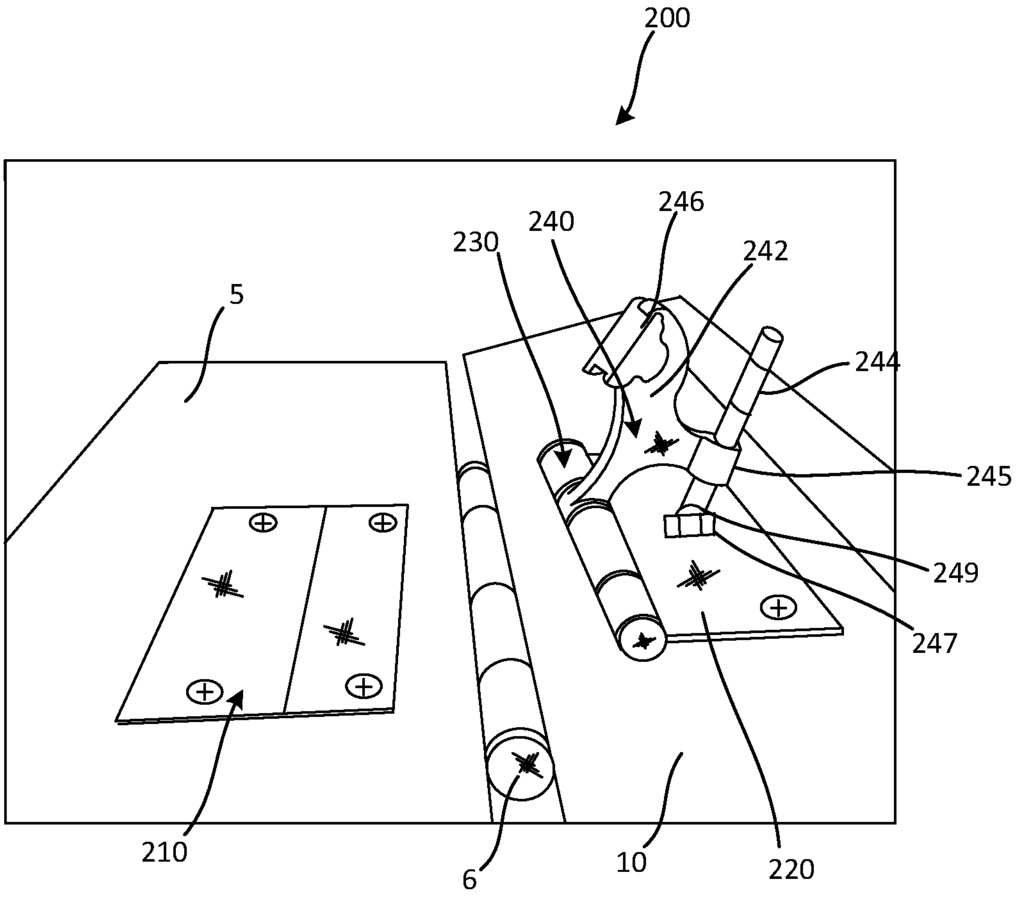
FIG. 8 is a bottom-front view of the device of FIG. 7 showing a first stopper assembly according to an embodiment of the present disclosure.
Figure 9:
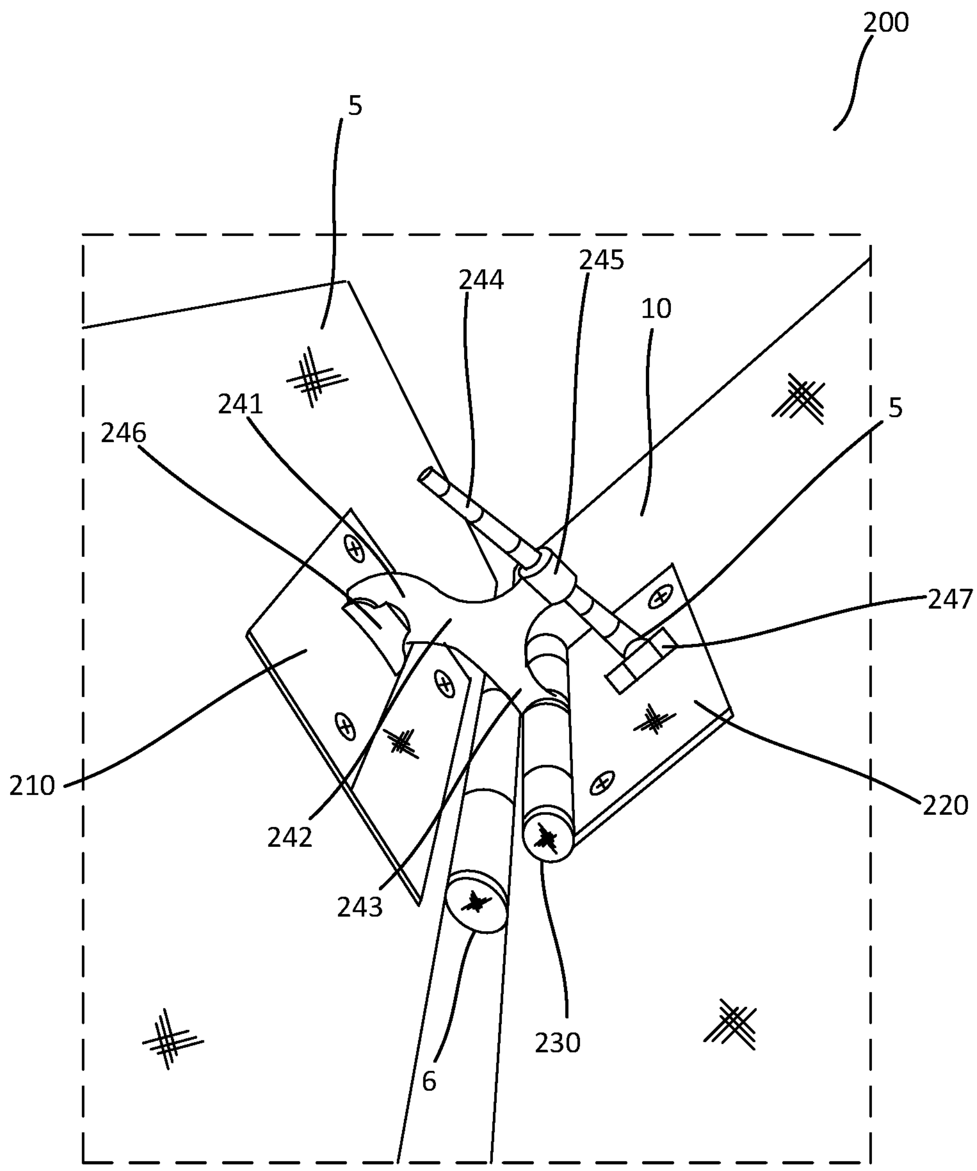
FIG. 9 is a bottom-front of the device of FIG. 7 showing the first stopper assembly according to an embodiment of the present disclosure.

Referring now to FIGS. 8-9 showing various views of the device 200 of FIG. 7, according to an embodiment of the present disclosure. Preferably, the first attachment plate 210 may be configured to attach to the door 5 cleanly—in that no damage is made to the door 5. For example, the first attachment plate 210 may be attached to the door 5 via an adhesive such as self-adhesive screws. However, other attachments may also be contemplated. Whilst it is preferable that the first attachment plate 210 is attached to the door 5 without causing damage to the door 5, in some embodiments, the first attachment plate 210 may be attached to the door 5 via permanent means.

The second attachment plate 220 may also be attached or installed onto the door frame 10 without causing damage. However, in some embodiments, to provide stability, the second attachment plate 220 may be attached to the door frame 10 via screws. The screws may be 2 inches in length for example. The screws may fasten to behind a door frame casing and drywall adjacent the door 5. This may provide additional support to the device 200 when in use. To further aid in stability, the first attachment plate 210 and the second attachment plate 220 may comprise a steel material. However, other materials are also contemplated.

As shown, the stopper hinge 230 may be attached to the second attachment plate 220. Preferably, the stopper hinge 230 may be integral to the second attachment plate 220. The stopper hinge 230 may be a barrel hinge including a stopper hinge pin 232 for allowing rotation of the same. In some embodiments, the stopper hinge 230 may also be made from the steel material, but again, other materials are also contemplated. The at least one stopper assembly 240 may be configured to selectively pivot about a vertical axis 231 via the stopper hinge 230. The addition of the stopper hinge 230 prevents the need to utilize the existing door hinges 6 of the door 5 and may enable use of the device 200 on doors with sealed hinges.

The body 242 may include a left arm 241, a right arm 243 and a tubular head 245 attached about a mid-section thereof.

The right arm 243 may be fixedly attached to the stopper hinge 230 and the left arm 241 may include an arm cap 246 configured to engage with the first attachment plate 210.

The stopper rod 244 may be inserted into the tubular head 245. In some embodiments, the stopper rod 244 may include male threads and the tubular head 245 may include female threads. The stopper rod 244 may be threaded into the tubular head 245. Preferably, a length of the stopper rod 244 may be adjustable. In the thread embodiment, the length of the stopper rod 244 may be adjustable via selective unscrewing and screwing of the stopper rod 244 through the tubular head 245. Adjusting the length of the stopper rod 244 may dictate a degree to which the door 5 is held open. For example, if a user desires the door to be held open at a 45-degree angle, they may extend the length of the stopper rod (either by screwing the stopper rod tighter or another method).

The stopper assembly 240 may be configured to prevent movement of the door 5 past a desired position. The stopper assembly 240 may include a body 242 and a stopper rod 244. As shown, the stopper rod 244 may include a cap 247. The cap 247 is secured to stopper rod 244 by swivel 249, such as a ball bearing. The swivel allows the cap 247 to engage in an aligned or flush configuration with the second attachment plate 220. This allows for exerted force brought on by stopping of the door 5 to be more evenly distributed across the cap 247 and the second attachment plate 220.

Figure 10:
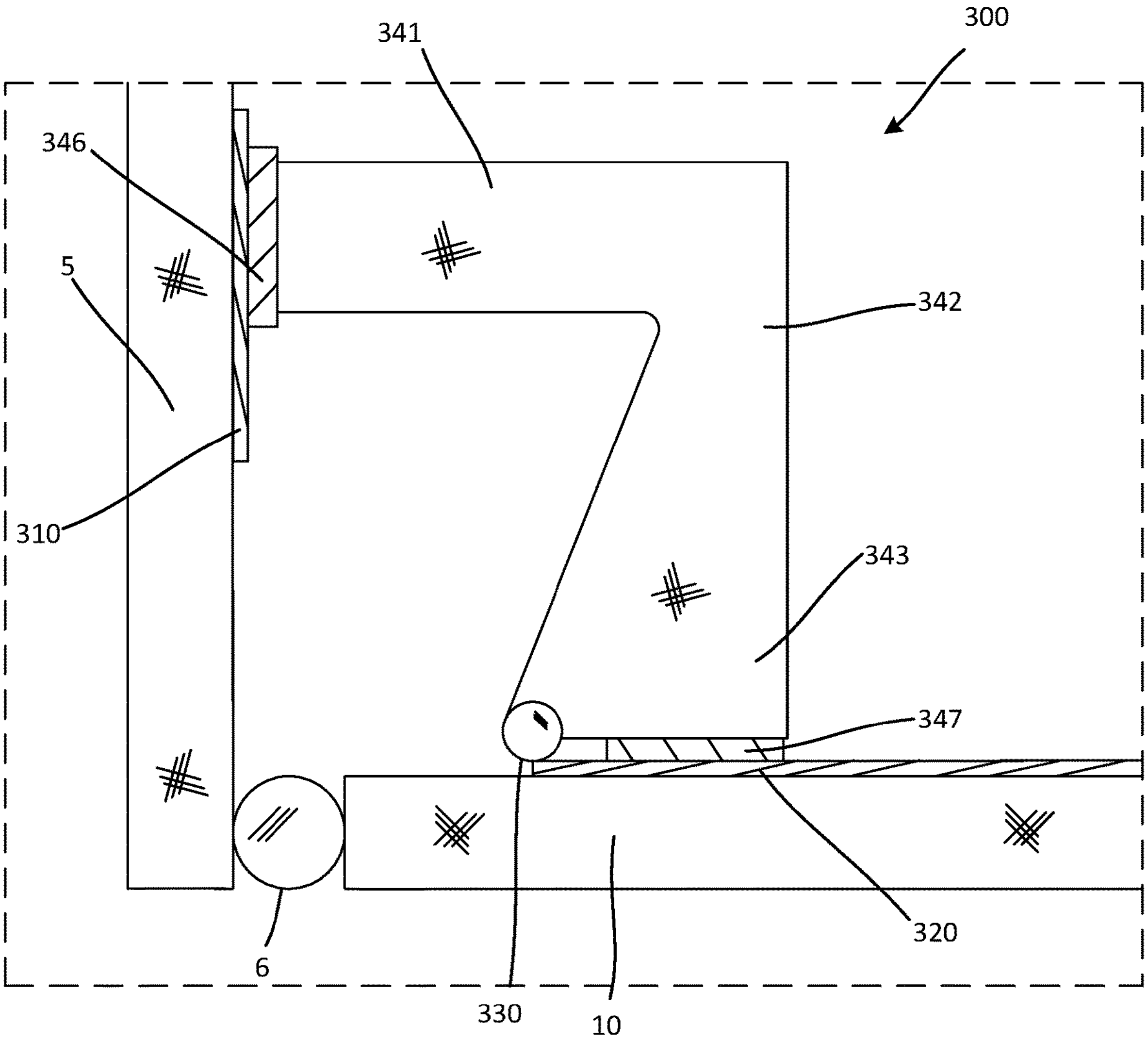
FIG. 10 is a side view of an additional embodiment of the present disclosure.

In some embodiments the stopper assembly can be configured to prevent the door 5 from opening past a fixed angle. For example, as shown in FIG. 10, another embodiment of stopper assembly 340 is illustrated. Stopper assembly 340 is configured to hold the door 5 in the open position at a 90-degree angle. In this embodiment, the body 342 may include a left arm 341, a right arm 343. The right arm 343 may be attached to the stopper hinge 330 and includes a cap 347 which engages the first restraining plate 310. The left arm 341 may include an arm cap 346 configured to engage with the first attachment plate 310. Further, right arm 343 and left arm 341 are aligned to form a 90-degree angle relative to each other. The angle between the right arm 343 and the left arm 341 in operation prevents door 5 from opening past that angle. In this embodiment, door 5 cannot open past a 90-degree angle relative to the door frame 10.

Figure 11:
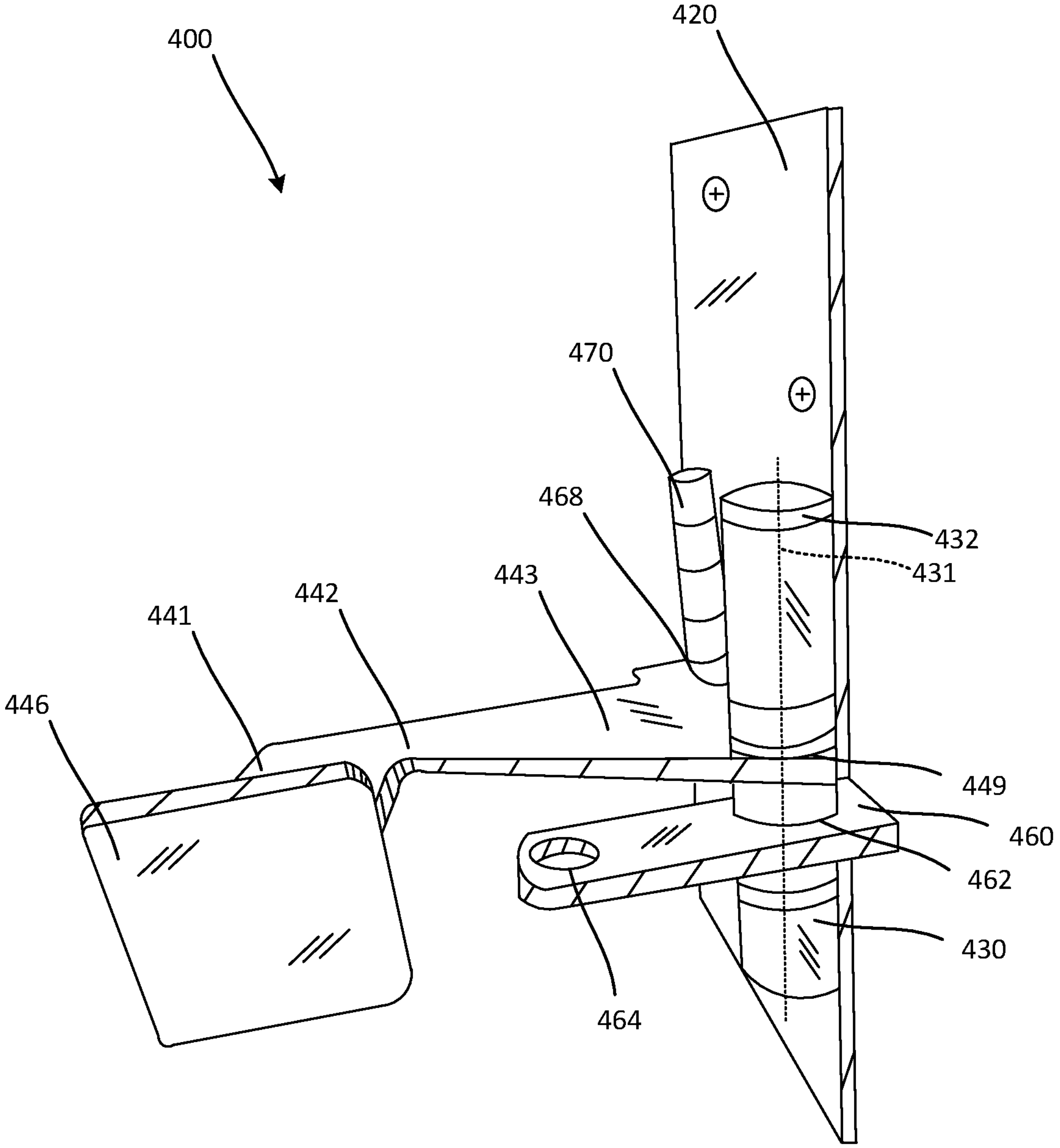
FIG. 11 is a perspective view of an additional embodiment of the stopper assembly of the present disclosure.
Figure 12:
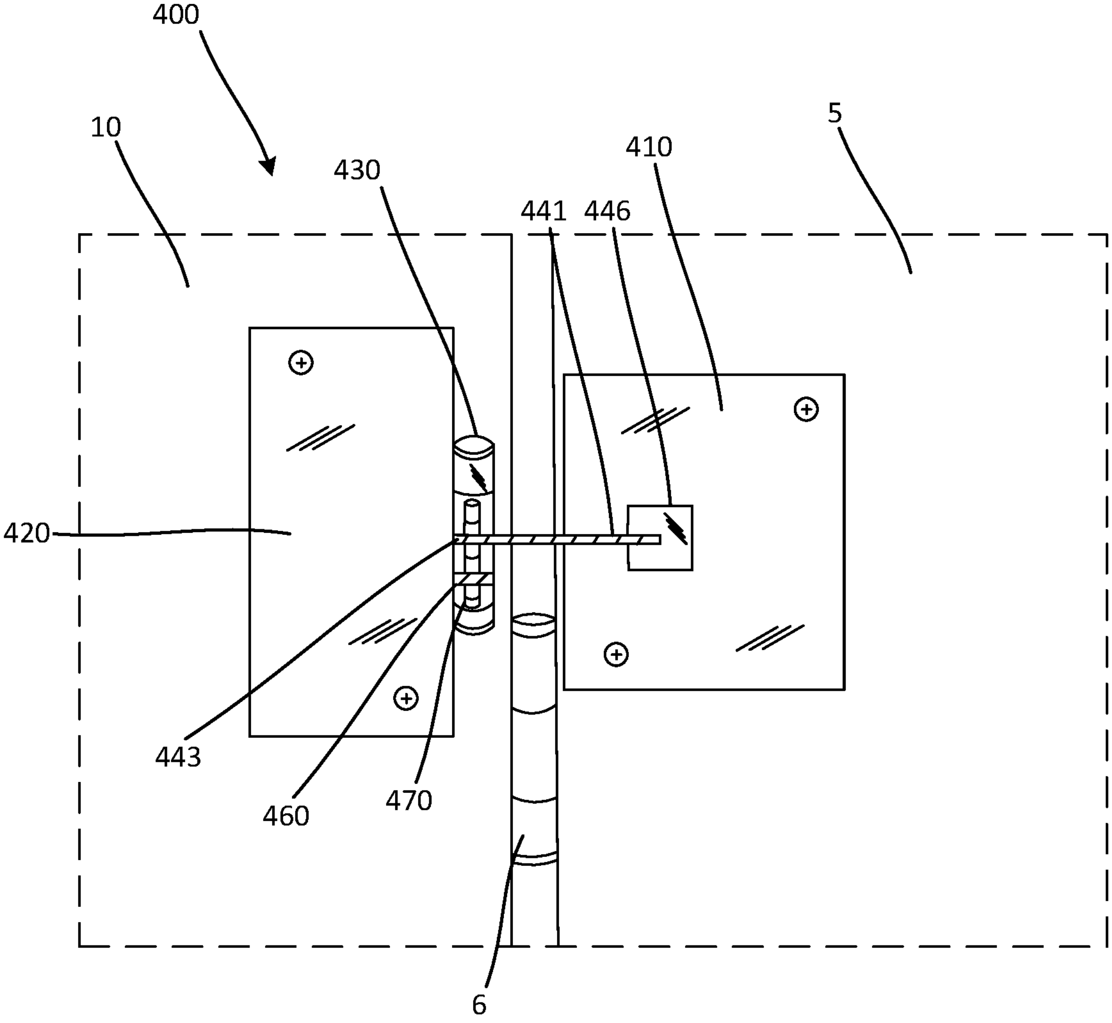
FIG. 12 is a front view of the device of FIG. 11 in a closed position, according to an embodiment of the present disclosure.

As illustrated in FIG. 11-12, an additional embodiment is shown. In this embodiment, the stopper assembly 440 includes a stopper hinge opening 449 which is configured to receive the stopper hinge pin 432 of stopper hinge 430 to allow for selectively pivotal movement about a vertical axis 431 via the stopper hinge 430. The stopper assembly 440 includes a body 442. The body 442 may include a left arm 441 and a right arm 443. In some embodiments, not shown, a tubular head may be attached about a mid-section thereof. The right arm 443 may be fixedly attached to the stopper hinge 430 and the left arm 441 may include an arm cap 446 configured to engage with the first attachment plate. Further, right arm 443 of stopper assembly 440 includes a locking opening 468 located at distal from the stopper hinge 430 and is aligned in the same orientation as the stopper hinge opening 449.

The stopper assembly 440 further includes a locking arm 460 having a locking arm hinge opening 462 which is configured to receive the stopper hinge pin 432 of stopper hinge 430. Locking arm 460 is configured to be fixed in place to prevent pivotal movement about a vertical axis 431 via the stopper hinge 430. Locking arm 460 further includes a locking arm opening 464 located at distal from the stopper hinge 430 and is aligned in the same orientation as the stopper hinge opening 449.

The stopper assembly 440 further includes a locking pin 470 that is configured to engage stopper hinge opening 449 and locking arm opening 464. When engaged, stopper assembly 440 is locking in place which prevents movement by door 5. When not engaged, the door 5 may be opened. To aid in security of the device 400, the locking pin 470 may be made from steel material. However, other materials are contemplated.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A device for substantially preventing movement of a door, the door being located within a door frame being adjacent to the door and being movable between an open position and a closed position via at least one door hinge, the open position including a varying degree of said open positions, the device comprising:

a first attachment plate configured to attach to the door;

a second attachment plate configured to attach to the door frame, the second attachment plate having a stopper hinge, the location of the first attachment plate and the second attachment plate on the door and door frame are configured to allow for the stoppage of the door without modification of the door hinge; and a stopper assembly configured to selectively pivot about a vertical axis via the stopper hinge, the stopper assembly including a body, the body having a left arm, a right arm and tubular head attached about a mid-section thereof, the left arm including an arm cap configured to engage with the first attachment plate, the right arm being fixedly attached to the stopper hinge, the stopper assembly including a locking arm having a locking arm hinge opening which is configured to receive a stopper hinge pin, locking arm includes a locking arm opening located at distal from the locking arm hinge opening and is aligned in the same orientation as the stopper hinge opening, the stopper assembly includes a locking pin configured to engage the stopper hinge opening and the locking arm opening, wherein the right arm further including a locking opening located distal from the stopper hinge and being aligned in the same orientation as the stopper hinge opening; and wherein when engaged the stopper assembly is locking in place which prevents movement by the door and when not engaged the door may be opened, wherein the at least one stopper assembly is configured to prevent movement of the door past a desired position.

2. The device of claim 1, wherein the first attachment plate is attached to the door via self-adhesive screws.

3. The device of claim 2, wherein the first attachment plate and the second attachment plate comprise a steel material.

4. The device of claim 3, wherein the body comprise the steel material.

5. The device of claim 4, wherein the first stopper rod made from the steel material.

6. A device for substantially preventing movement of a door, the door being located within a door frame being adjacent to the door and being movable between an open position and a closed position via at least one door hinge, the open position being a fixed open position, the device comprising:

a first attachment plate configured to attach to the door;

a second attachment plate configured to attach to the door frame, the second attachment plate having a stopper hinge, the location of the first attachment plate and the second attachment plate on the door and door frame are configured to allow for the stoppage of the door without modification of the door hinge; and a stopper assembly configured to selectively pivot about a vertical axis via the stopper hinge, the stopper assembly including a body, the body having a left arm, a right arm, the left arm including an arm cap configured to engage with the first attachment plate, the right arm being fixedly attached to the stopper hinge, the right arm including a cap which engages the first attachment plate, the right arm and left arm being aligned to form a fixed degree angle relative to each other, wherein the stopper assembly is configured to prevent movement of the door past the fixed degree, wherein the right arm further including a locking opening located distal from the stopper hinge and being aligned in the same orientation as the stopper hinge opening; and the stopper assembly further comprising a locking arm having a locking arm hinge opening which is configured to receive a stopper hinge pin, locking arm includes a locking arm opening located at distal from the locking arm hinge opening and is aligned in the same orientation as the stopper hinge opening, the stopper assembly includes a locking pin configured to engage the stopper hinge opening and the locking arm opening, wherein when engaged the stopper assembly is locking in place which prevents movement by the door and when not engaged the door may be opened.

7. The device of claim 6, wherein the fixed degree angle is a 90-degree angle.

8. A device for substantially preventing movement of a door, the door being located within a door frame being adjacent to the door and being movable between an open position and a closed position via at least one door hinge, the open position including a varying degree of said open positions, the device comprising:

a first attachment plate configured to attach to the door;

a second attachment plate configured to attach to the door frame, the second attachment plate having a stopper hinge with a stopper hinge pin therethrough, the location of the first attachment plate and the second attachment plate on the door and door frame are configured to allow for the stoppage of the door without modification of the door hinge; and a stopper assembly including a stopper hinge opening and configured to receive the stopper hinge pin to selectively pivot about a vertical axis via the stopper hinge, the stopper assembly including a body, the body having a left arm, a right arm and tubular head attached about a mid-section thereof, the left arm including an arm cap configured to engage with the first attachment plate, the right arm being fixedly attached to the stopper hinge, the right arm including a locking opening located distal from the stopper hinge and being aligned in the same orientation as the stopper hinge opening, the stopper assembly includes a locking arm having a locking arm hinge opening which is configured to receive the stopper hinge pin, locking arm includes a locking arm opening located at distal from the locking arm hinge opening and is aligned in the same orientation as the stopper hinge opening, the stopper assembly includes a locking pin configured to engage the stopper hinge opening and the locking arm opening, wherein when engaged the stopper assembly is locking in place which prevents movement by the door and when not engaged the door may be opened, wherein the at least one stopper assembly is configured to prevent movement of the door past a desired position.

* * * * *